(12) United States Patent
Beul et al.

(10) Patent No.: US 8,487,467 B2
(45) Date of Patent: Jul. 16, 2013

(54) OPERATION OF A GAS AND A STEAM TURBINE SYSTEM BY MEANS OF A FREQUENCY CONVERTER

(75) Inventors: Ulrich Beul, Essen (DE); Matthias Heue, Bochum (DE); Thomas Hofbauer, Muelheim/Ruhr (DE); Hartmut Popella, Westerkappeln (DE); Armin De Lazzer, Mülheim an der Ruhr (DE)

(73) Assignee: Siemens Aktiengesellschaft, München (DE)

( * ) Notice: Subject to any disclaimer, the term of this patent is extended or adjusted under 35 U.S.C. 154(b) by 171 days.

(21) Appl. No.: 12/999,145

(22) PCT Filed: Apr. 20, 2009

(86) PCT No.: PCT/EP2009/054659
§ 371 (c)(1),
(2), (4) Date: Mar. 10, 2011

(87) PCT Pub. No.: WO2009/153082
PCT Pub. Date: Dec. 23, 2009

(65) Prior Publication Data
US 2011/0169278 A1     Jul. 14, 2011

(30) Foreign Application Priority Data
Jun. 16, 2008 (EP) .................................. 08010920

(51) Int. Cl.
*F01D 15/10* (2006.01)
*F02C 6/00* (2006.01)
*H02K 7/18* (2006.01)

(52) U.S. Cl.
USPC ........................................... 290/52; 290/40 C

(58) Field of Classification Search
USPC ................ 290/52, 40 R, 40 C, 51; 60/646, 60/657, 773; 322/29; 700/288
See application file for complete search history.

(56) References Cited

U.S. PATENT DOCUMENTS

| 3,879,616 A | * | 4/1975 | Baker et al. | 290/40 R |
| 4,077,748 A | * | 3/1978 | Potz | 417/319 |
| 4,340,820 A | * | 7/1982 | Meyer-Pittroff et al. | 290/40 R |
| 4,421,989 A | * | 12/1983 | Brannstrom | 290/40 R |
| 5,042,247 A | * | 8/1991 | Moore | 60/773 |
| 5,694,026 A | | 12/1997 | Blanchet | |

(Continued)

FOREIGN PATENT DOCUMENTS

| CN | 1048469 A | 1/1991 |
| CN | 1673650 A | 9/2005 |
| CN | 1958392 A | 5/2007 |

(Continued)

OTHER PUBLICATIONS

Communication From Russian Patent Office dated Feb. 7, 2013, pp. 1-7.

*Primary Examiner* — Julio C. Gonzalez

(57) ABSTRACT

A method for operating a gas and steam turbine system is provided. The system includes a frequency converter which is assigned to a starting device of a gas turbine, and a generator which is assigned to a steam turbine. The intention is to be able to obtain a particularly high level of operational flexibility with particularly low mechanical complexity. For this purpose, the electrical power of the generator is fed into a consumer system via the frequency converter.

3 Claims, 1 Drawing Sheet

U.S. PATENT DOCUMENTS

| | | | |
|---|---|---|---|
| 6,240,730 B1* | 6/2001 | Thiele | 60/646 |
| 7,073,335 B2* | 7/2006 | Gerdes et al. | 60/727 |
| 7,692,327 B2* | 4/2010 | Althaus | 290/52 |
| 2004/0045299 A1* | 3/2004 | Blatter et al. | 60/772 |
| 2006/0232071 A1* | 10/2006 | Althaus | 290/40 R |
| 2008/0010036 A1* | 1/2008 | Swahn et al. | 702/132 |
| 2008/0022687 A1* | 1/2008 | Althaus et al. | 60/727 |
| 2008/0303279 A1* | 12/2008 | Lehmann et al. | 290/5 |

FOREIGN PATENT DOCUMENTS

| | | |
|---|---|---|
| RU | 2121746 C1 | 11/1998 |
| WO | WO 99/28599 A1 | 6/1999 |
| WO | WO 2005/047789 A2 | 5/2005 |

* cited by examiner

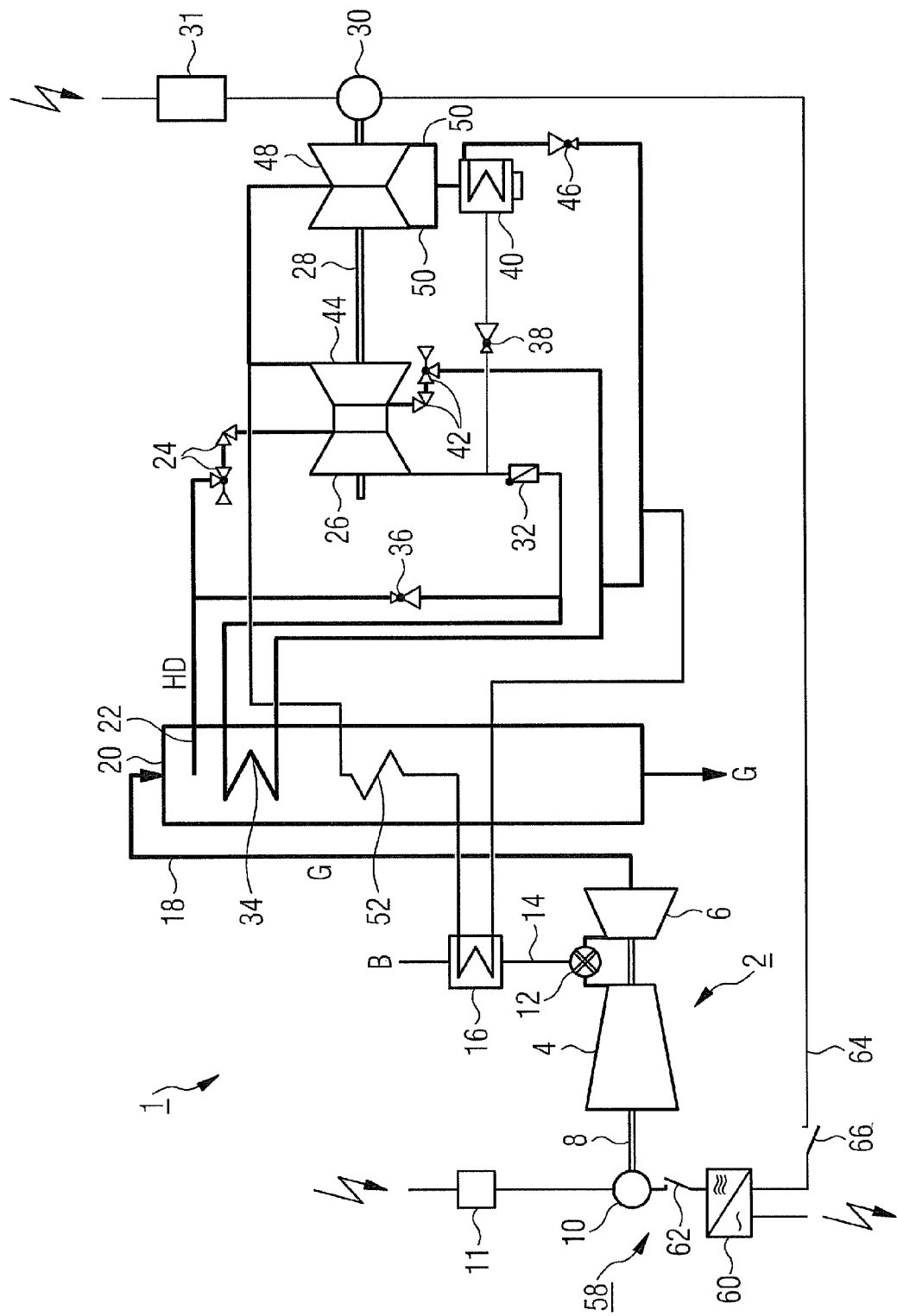

OPERATION OF A GAS AND A STEAM TURBINE SYSTEM BY MEANS OF A FREQUENCY CONVERTER

CROSS REFERENCE TO RELATED APPLICATIONS

This application is the U.S. National Stage of International Application No. PCT/EP2009/054659, filed Apr. 20, 2009 and claims the benefit thereof. The International Application claims the benefits of European Patent Office application No. 08010920.0 EP filed Jun. 16, 2008. All of the applications are incorporated by reference herein in their entirety.

FIELD OF INVENTION

The invention relates to a method for operating a gas and steam turbine system with a frequency converter which is assigned to a starting device of a gas turbine, and a generator which is assigned to a steam turbine. It also relates to a gas and steam turbine system of this type.

BACKGROUND OF INVENTION

Gas and steam turbine systems are predominantly used to generate energy. Here a modern gas and steam turbine system usually includes one to four gas turbines and at least one steam turbine, with either each turbine powering a generator in each instance (multishaft system) or a gas turbine with the steam turbine on a shared shaft powering an individual generator (solid turbine system). The hot exhaust gases of the gas turbine are used here in a heat-recovery steam generator to generate steam. The steam is then fed in to the steam turbine. Approximately two thirds of the electrical power is usually allotted to the gas turbine and a third to the steam process.

The power of conventional gas and steam turbine systems lies for instance in the range between 80 MW and 830 MW per unit of gas turbine/steam turbine, with it being possible for a power plant to consist of several units. In comparison, a block of a nuclear power plant usually has a power between 500 MW and 1500 MW.

To increase the efficiency of the steam turbine of the gas and steam turbine system, this usually includes several pressure stages, which are configured for different steam pressures. In this way, the steam which is superheated in the heat-recovery steam generator with the aid of the exhaust gas of the gas turbine is fed back into the heat-recovery steam generator after its decrease in tension in the high pressure stage of the steam turbine and is superheated again. This steam is then fed to the downstream pressure stages. This so-called intermediate superheating increases the efficiency of the steam turbine above the higher average temperature of the heat supply. Incidentally, erosion on the last blades in the low pressure part of the steam turbine is therefore prevented as a result of excessively high wetness of steam.

A plurality of pressure stages in a steam turbine is theoretically conceivable, however the additional capital expenditure is then too high in proportion to the thermotechnical improvement. A gas and steam turbine system with three pressure stages in the steam turbine and a single intermediate superheating currently represents the economical optimum.

As a result of its flexibility, in particular the possibility of a rapid start-up, modem gas and steam turbines are often used to provide briefly occurring high power needs in the mains supply, so-called peak loads. This results in comparatively frequent start-up processes in gas and steam turbine systems. To start up the gas turbine, the generator assigned to the gas turbine is usually used here as an engine, with the speed of the gas turbine slowly being increased with the aid of a system-specific characteristic curve. To this end, a starting device with a frequency converter can usually be connected upstream of the generator, said frequency converter being able to generate power at any frequency from the mains network.

In the state of permanent operation, the turbines of the gas and steam turbine system usually rotate with the mains frequency of 50 Hz or 60 Hz. Operating states may however also be desired or needed, in which the steam turbine rotates in particular with a minimal speed, during a bridging of the high pressure stage of the steam turbine on the steam side or during the heating process.

In the case of lower speeds as the power frequency, the generator of the steam turbine must however be decoupled here from the mains supply. Accordingly, no power is taken by way of the generator in these operating states, as a result of which the counter torque acting on the steam turbine is comparatively minimal and the steam turbine can in some circumstances not be kept at a constant speed. This nevertheless indicates a loss of flexibility in respect of the mode of operation of the overall gas and steam turbine system, and possibly unfavorable operating points (for instance retaining speeds, which are close to the natural frequencies) are taken into account, which could result in unnecessary damage and ageing of the steam turbine.

SUMMARY OF INVENTION

The object underlying the invention is therefore to specify a method for operating a gas and steam turbine system of the aforecited type, with which a particularly high operational flexibility can be achieved with particularly low structural outlay. Furthermore, a gas and steam turbine system which is particularly suited to implementing the method is to be specified.

In respect of the method, this object is achieved in accordance with the invention by the electrical power of the generator assigned to the steam turbine being fed into a public mains way of the frequency converter assigned to the starting device of the gas turbine.

The invention is based on the assumption that a particularly high flexibility would be achievable during operation with a particularly minimal structural outlay if a decrease in power, which is tailored to suit a market need, could be realized by the steam turbine with as simple technical means as possible. It is advantageous here, particularly with gas and steam turbine systems, that the engine provided at the start of the gas turbine be fed by way of a frequency converter. A frequency converter is therefore already present in the gas and steam turbine system. Furthermore, the operating states, in which a comparatively minimal speed of the steam turbine is needed, usually only occur if the gas turbine is already operating. The frequency converter of the engine for starting up the gas turbine is therefore not used in these operating states and is therefore available in the manner of a resource available in the system for other applications. The frequency converter of the starting machine of the gas turbine is to be used in the said operating phases for the flexible coupling of the steam turbine generator to the mains supply. Here power is taken from the generator of the steam turbine by way of the frequency converter and is fed into a public mains so that the speed of the steam turbine can be stabilized.

In an advantageous embodiment, the gas and steam turbine system is configured as a multishaft system. A separate frequency converter which is assigned to the gas turbine, exists particularly in the case of multishaft systems of this type, in which the steam turbine and gas turbine each have a separately assigned generator and the gas turbine is started independently of the steam turbine.

The power is advantageously supplied by way of the frequency converter at a speed below the provided operational speed of the steam turbine. Particularly in operating states with a lower speed, an additional drop in power is needed in order to stabilize even this speed. With the provided operational speed, i.e. with a speed having the mains frequency of 50 Hz or 60 Hz, the generator is namely connected to the public mains by way of a spot frequency transformer assigned thereto and thus provides for a stabilization of the speed.

The steam turbine is advantageously configured in several stages, and power is supplied by way of the frequency converter during a bridging of the high pressure stage of the steam turbine on the steam side or advantageously during the heating process of the steam turbine. These operating states are namely the operating states, in which the speed of the steam turbine is to be held at a speed below the provided operational speed of the steam turbine, on the other hand however, the gas turbine is already operating, and the frequency converter of the gas turbine is no longer used. The latter can therefore be used particularly in these operating states in order to stabilize the speed of the steam turbine.

The advantages associated with the invention consist in particular in that by reducing electrical power in a generator assigned to the steam turbine by way of a frequency converter, which is assigned to a starting device of the gas turbine, an improved flexibility in respect of the mode of operation and extension of the permissible operating and boundary conditions of the gas and steam turbine system is possible overall. There is also the option, particularly during the heat-up process of the steam turbine, of better maintaining speed stop bands and/or retaining larger distances from potentially hazardous natural frequencies. The safety of the gas and steam power turbine system components is thus increased. Furthermore, additional, appreciable increased efficiency in terms of electrical energy is thus made available to the public mains, particularly during the starting process of the steam turbine. In fact, advantages of this type can also be achieved by an additional frequency converter which can be connected to the steam turbine. The use of the frequency converter of the starting device of the gas turbine nevertheless achieves a particularly resource-saving dual use both for gas and also steam turbines.

BRIEF DESCRIPTION OF THE DRAWINGS

An exemplary embodiment of the invention is described in more detail with the aid of the drawing, in which the FIGURE shows a schematic drawing of a multishaft gas and steam turbine system.

DETAILED DESCRIPTION OF INVENTION

The multishaft gas and steam turbine system 1 according to the FIGURE comprises a gas turbine 2, which includes a compressor 4 and a turbine 6 and is connected to a generator 10 by way of a shaft 8. The energy generated by the gas turbine 2 is output to a public mains by way of a spot frequency transformer 11. The gas turbine 2 is driven by combusting fuel fed into a fuel line 14 through a fuel delivery facility 12. In order to increase the efficiency of the gas turbine 2, the fuel B is preheated by means of a fuel preheating facility 16.

The energy released by combusting the fuel B is converted into mechanical energy in the gas turbine 2 and transmitted to the generator 10 via the shaft 8, by it being converted into electrical energy. The flue gas G released in the turbine 6 is then fed to a heat recovery steam generator 20 by way of an exhaust gas line 18, where, on account of its comparatively high temperature of for instance approximately 650° C., it is used for steam generation. The flue gas G is then fed to a smokestack (not shown in more detail).

In the heat-recovery steam generator 20, superheated high pressure steam HD is generated in the heating surfaces 22. Different configurations of the heating surfaces 22 are conceivable here. Water is usually fed to the evaporator heating surfaces from a heat pump (not shown), in which the water is partially or completely evaporated. The unevaporated water can if necessary subsequently be separated from steam in a water separation facility and the steam is fed to superheater heat surfaces whereby its thermal energy is further increased.

Control valves 24 connect to the heating surfaces 22, by means of which the high pressure steam HD is finally routed into the high pressure turbine stage 26. The steam is released here and the thermal energy is thus converted into mechanical energy, which is transmitted to a generator 30 by way of a shaft 28, where it is converted into electrical signal and output to a public mains by way of a transformer 31. The released steam is effected from the high pressure turbine stage 26 and is fed to further superheater heating surfaces 34 in the heat-recovery steam generator 20 by way of a controller 32. Here the path of the high pressure steam can be influenced as a function of the operation mode. If necessary, the high pressure steam from the heating surfaces 22 can be passed over the high pressure turbine stage 26 via a valve 36.

If the steam escaping from the high pressure turbine stage 26 is too hot or has excessively high pressure for further use, which may occur particularly during the starting process of the steam turbine, part of the steam can be discharged directly to the condenser 40 by way of a valve 38. Steam is cooled there and transferred back into liquid water, which can be fed again to the evaporator process into the heating surfaces 22 of the heat-recovery steam generator 20. The entire energy content of the steam is however rejected here.

The steam escaping from the high pressure turbine stage 26 in the superheater heating surfaces is heated again and fed to the medium pressure turbine stage 44 by way of further control valves 42. Here the medium pressure turbine stage 44 is on the same shaft 28 as the high pressure turbine stage 26. If necessary, the steam can also be discharged into the condenser 40 directly by way of a valve 46.

After release in the medium pressure turbine stage 44, part of the steam is fed to the low pressure turbine stage 48, which in turn rests on the same shaft 28 as the medium pressure turbine stage 44 and the high pressure turbine stage 26. After its release in the low pressure turbine stage 48, the steam is finally fed to the condenser 40 by way of branches 50, where it is cooled and then fed into liquid water, which can be fed again to the evaporator process into the heating surfaces 22 of the heat-recovery steam generator 20.

Condensate is fed into the heat-recovery steam generator 20 from the medium pressure turbine stage 44, where it is evaporated and heated into the heating surfaces 52. This steam is then routed into the fuel preheating facility 16 by way of a steam drum 54 and is used there to preheat the fuel B, as a result of which the efficiency of the gas turbine 2 is increased by increasing the temperature of the fuel B and thus of the gas mixture in the combustion chamber of the gas turbine 2.

A starting device 58 is assigned to the gas turbine 2 for its start-up. The starting device includes the generator 10, which is used as a motor, and a frequency converter 60, which can be connected by way of a switch 62, and which can control the gas turbine 2 at any speed with the aid of electrical energy from the electric mains and the generator 10.

The gas and steam turbine system 1 is a multishaft system; since the steam for the steam turbine is generated with the aid of the exhaust gas G of the gas turbine 2, the steam turbine is only operated if the gas turbine 2 has already started. The frequency converter 60 of the starting device 58 is then no longer needed for the gas turbine 2. The consequential use of this knowledge is that the gas and steam turbine system 1 is designed for a particularly high operational flexibility with a particularly low structural outlay, by the frequency converter 60 being designed for a dual function. To this end, it is connected to the generator 30 of the steam turbine by way of a line 64 with a switch 66. In operating states in which a lower operating speed is needed than the operating speed of the steam turbine provided, like for instance during the heating stage, power is taken from the generator 30 of the steam turbine by way of the frequency converter 60 so that the speed of the steam turbine is stabilized. A significant gain in terms of operational reliability of the gas and steam turbine system is thus achieved using simple technical means.

The invention claimed is:

1. A method for operating a gas and steam turbine system, comprising:

providing a frequency converter assigned to a starting device of a gas turbine and a first generator assigned to a steam turbine wherein the starting device also includes a second generator which is connected to an electricity network via a frequency transformer and wherein the first generator is connected to the electricity. network via a transformer;

connecting the frequency converter for starting the gas turbine to the starting device;

generating electricity by the frequency converter with a corresponding frequency from the electricity network;

connecting the frequency converter to the first generator after the gas turbine is started; and decoupling the first generator from the electricity network via the transformer, wherein electrical power of the first generator is fed into the electricity network by way of the frequency converter, and wherein the steam turbine is designed with a plurality of stages and power is fed by way of the frequency converter during a bridging of a high pressure stage of the steam turbine on a steam side.

2. The method as claimed in claim 1, wherein the gas and steam turbine system is designed as a multishaft system.

3. The method as claimed in claim 1, wherein power is fed by way of the frequency converter at a speed below a provided operating speed of the steam turbine.

\* \* \* \* \*